(12) United States Patent
Rys et al.

(10) Patent No.: US 7,730,048 B2
(45) Date of Patent: *Jun. 1, 2010

(54) SYSTEMS AND METHODS FOR TRANSFORMING QUERY RESULTS INTO HIERARCHICAL INFORMATION

(75) Inventors: Michael Rys, Sammamish, WA (US); Yevgeniy L. Kogan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 257 days.

This patent is subject to a terminal disclaimer.

(21) Appl. No.: 11/536,003

(22) Filed: Sep. 28, 2006

(65) Prior Publication Data

US 2007/0022103 A1 Jan. 25, 2007

Related U.S. Application Data

(63) Continuation of application No. 10/623,369, filed on Jul. 17, 2003, now Pat. No. 7,213,017, which is a continuation-in-part of application No. 09/528,078, filed on Mar. 17, 2000, now Pat. No. 6,708,164.

(51) Int. Cl.
G06F 17/30 (2006.01)
(52) U.S. Cl. ........................... 707/705; 715/210
(58) Field of Classification Search .................. 707/1–6
See application file for complete search history.

(56) References Cited

U.S. PATENT DOCUMENTS

| | | | |
|---|---|---|---|
| 6,356,920 B1 | 3/2002 | Vandersluis | |
| 6,366,934 B1 | 4/2002 | Cheng et al. | |
| 6,480,860 B1 | 11/2002 | Monday | |
| 6,484,160 B1 | 11/2002 | Richard et al. | |
| 6,591,260 B1 | 7/2003 | Schwarzhoff et al. | |
| 6,604,100 B1 * | 8/2003 | Fernandez et al. | 707/3 |

OTHER PUBLICATIONS

W3C ("Namespaces in XML" World Wide Web Consortium Jan. 14, 1999).

(Continued)

*Primary Examiner*—Yicun Wu
(74) *Attorney, Agent, or Firm*—Workman Nydegger

(57) ABSTRACT

A computerized system and method for transforming (formatting or aggregating) the results of a query into a hierarchical information stream, such as an eXtensible Markup Language (XML) data stream is disclosed. A database server receives a query and generates a rowset. A rowset processor, using the mode specified in the query, processes the rowset and query to generate the XML data stream. For the "auto1" mode, the rowset processor transforms a rowset into an XML data stream using primary-foreign key information specified in the query to determine nesting. For the "auto2" mode, the rowset processor transforms a rowset into an XML data stream using table ordering information included in the query to determine nesting. For the "explicit" mode, the rowset processor transforms a rowset into an XML data stream using the explicit organizational information specified in the query. In one embodiment, it is easier for a developer to compose expressions to generate nested hierarchical structures than previous formulations and simpler semantics are provided without implicit hierarchy inference. The syntax of an embodiment of the hierarchical formatting function includes optional arguments including a name option, a root option, map option, namespace options and a null option.

18 Claims, 10 Drawing Sheets

OTHER PUBLICATIONS

"XML-QL: A Query Language for XML", http://www.w3.org/TR/1998/NOTE-xml-gl-19980819/, Submission to the World Wide Web Consortium, 1-19, (Aug. 19, 1998).

P. Wadler, "XML", http://www.cs.bell-labs.com/who/wadler/topics/xml.html. A Data Model and Algebra for XML Query, 1-3, (Nov. 1999).

Oracle8 Concepts, Release 8.0 Dec. 1997.

Abiteboul, S., et al., "The Lorel Query Language for Semistructured Data", International Journal of Digital Libraries, 1997, 1(1), 68-88.

Deutsch, A., et al., "Storing Semistructured Data with STORED", SIGMOD, 1999, 431-442.

Shanmugasundaram, J., et al., "Relational Databases for Querying XML Documents: Limitations and Opportunities", VLDB, 1999, 302-314.

DeSousa, A., et al. "Mapping Rules to Convert from ODL to XML-SCHEMA", Proceedings 22nd International Conference of the Chilean Computer Science Society, 2002, 133-141.

Deutsch, A., "A Query Language for XML", Computer Networks, 1999, 31(11-16), 1155-1169.

Du, W., "XML Structures for Relational Data", Proceedings of the Second International Conference on Web Information Systems Engineering, 2002, 1, 151-160.

Feng, D., "Research and Implementation of Mapping Relational Database to Extensible Markup Language Document", Journal of Xi'an Jiaotong University, Oct. 2002, 36(10), 1066-1069, 1074.

Jacinto, M.H. et al., "BiDirectional Conversion between XML Documents and Relational Databases", 7th International Conference on Computer Supported Cooperative Work in Design, 2002, 437-443.

Lee, D. et al., "Constraints-Preserving Inlining Algorithm for Mapping XML DTD to Relational Schema", Data & Knowledge Engineering, 2001, 39(1), 3-25.

Rys, M. "Bringing the Internet to you Database: Using SQl server 2000 and XML to Build Lossely-Coupled Systems", Conference Proceedings, Vision for a New Millenium, 2000, 109-122.

Shanmugasundaram, J., et al., "A General Technique for Querying XML Documents Using a Relational Database System", SIGMOD Record, 2001, 30(3), 20-26.

Wenwu, L. et al., "Lossless Mappingfrom Semi-Structured Data to Structured Data", Journal of Southeast university (English Edition), Mar. 2002, 18(1), 46-53.

* cited by examiner

```
<Customer name="Smith">
    <Order oids="1397">
        <Orderdetail quantity="10" product="ABC" price="100"/>
        <Orderdetail quantity="5"  product="DEF" price="50"/>
        <Orderdetail quantity="2"  product="GHI"/>
        <Employee id="987"/>
    </Order>
</Customer>
```

| A | 720a |
|---|---|
| id | x |
| 1 | 1 |
| 2 | NULL |
| 3 | 2 |

| B | 720b |
|---|---|
| a | y |
| 1 | 2 |
| 1 | 5 |
| 1 | 1 |
| 2 | 1 |

```
SELECT A1.id,                                    700b
XML(SELECT   A.x,
       XML(SELECT B.y as "@y" FROM B
           WHERE B.a=A.id ORDER BY B.y,
           name="B", map=path)
    FROM A WHERE A.id = A1.id, name="A") as x
FROM A A1
```

Resulting Rowset →

| | 710b |
|---|---|
| id | x |
| 1 | <A><br>  <x>1</x><br>  <B y="1"/><br>  <B y="2"/><br>  <B y="5"/><br></A> |
| 2 | <A><br>  <B y="1"/><br></A> |
| 3 | <A><br>  <x>2</x><br></A> |

FIG. 7B

| A | 730a |
|---|---|
| id | x |
| 1 | 1 |
| 2 | NULL |
| 3 | 2 |

| B | 730c |
|---|---|
| a | y |
| 1 | 'a' |
| 1 | 'b' |
| 1 | 'c' |
| 2 | 'd' |

```
SELECT A1.id,                                    700c
XML(SELECT
        CAST(
            XML(SELECT B.y || " " FROM B WHERE
                B.a=A.id ORDER BY B.y, name=" ")
            AS nvarchar(4000)) as "@by" ,
        A.x
    FROM A WHERE A.id = A1.id, map=path, name="A") as x
FROM A A1
```

Resulting Rowset

| id | x | 710c |
|---|---|---|
| 1 | `<A @by="a b c" >`<br>   `<x>1</x>`<br>`</A>` | |
| 2 | `<A @by="d" />` | |
| 3 | `<A>`<br>   `<x>2</x>`<br>`</A>` | |

FIG. 7C

SYSTEMS AND METHODS FOR TRANSFORMING QUERY RESULTS INTO HIERARCHICAL INFORMATION

RELATED APPLICATION

This application is a continuation of U.S. patent application Ser. No. 10/623,369, filed on Jul. 17, 2003, entitled "SYSTEMS AND METHODS FOR TRANSFORMING QUERY RESULTS INTO HIERARCHICAL INFORMATION", now issued as U.S. Pat. No. 7,213,017; which is a continuation-in-part of U.S. patent application Ser. No. 09/528,078, filed on Mar. 17, 2000, entitled "TRANSFORMING QUERY RESULTS INTO HIERARCHICAL INFORMATION", now issued as U.S. Pat. No. 6,708,164. This application is also related to U.S. patent application Ser. No. 10/765,348, filed on Jan. 27, 2004, entitled "TRANSFORMING QUERY RESULTS INTO HIERARCHICAL INFORMATION", now issued as U.S. Pat. No. 7,444,321. The entireties of the aforementioned applications are incorporated herein by reference.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice shall apply to this document: Copyright© 2000-2003, Microsoft Corp.

FIELD OF THE INVENTION

The present invention relates to data processing, and more particularly to the generation of hierarchical information in the context of transformational systems.

BACKGROUND

Two trends in networked computing are (1) the increasing use of hierarchical information systems, such as the eXtensible Markup Language (XML), for information exchange among networked applications and (2) the continuing and increasing use of relational database systems for managing businesses. These trends are likely to continue and accelerate in the future.

XML is widely used for exchanging hierarchical information in networked systems, such as local area networks, wide area networks, and the Internet. XML is one of the most important and most widely accepted standards to disseminate data and information between different applications over local networks and the Internet. XML has several characteristics that make it an attractive language for exchanging information among networked applications. First, XML is a text based language, so XML data streams are easily transported across systems with incompatible binary formats. Second, since information represented in XML is organized hierarchically, it allows a user to easily understand the relationships among the different types of information contained in an XML data stream, i.e., XML can transfer information about complex data relationships in a single, easy to understand form.

Relational database systems provide access to a significant percentage of all the information stored in modern business information processing systems. Relational database systems also allow users of the data to easily access and process the information stored in the systems from both local and remote locations. Unfortunately, a database query executed against a relational database returns information in the form of rowset(s) encoded either in binary or in nonstandard character format.

A large amount of both the existing and new data that is and will be disseminated in such ways will be stored in database systems. It is therefore important that the database system provides the programmer with the means to deliver XML for any query running against the database in this context. There is also a need to provide the programmer with the means to formulate such a query in a simple, and easily understood manner.

For these and other reasons there is a need for the present invention.

SUMMARY OF THE INVENTION

In consideration of the above-mentioned shortcomings, disadvantages and problems, various embodiments of the invention are implemented in connection with a database, such as a relational database, which processes a query and returns rowset(s) to the process initiating the query. The present invention also relates to systems and methods for implementing a rowset to XML formatter or aggregator that receives as input one or more relational rowsets and potentially some corresponding lineage data and generates a hierarchical serialization, e.g., XML serialization, of the data represented by the rowset(s). The invention enables an application programmer to formulate one or more queries and return the result(s) in a hierarchical format, such as XML, enabling Web Servers and the application programmer to deliver Web-aware data in a standard format.

In one aspect, the invention facilitates the composition of query expressions to generate nested hierarchical structures more easily than previous formulations and provides simpler semantics, without implicit hierarchy inference. The syntax of an improved formulation of the hierarchical information formatter, or formatting function, in accordance with the invention includes optional arguments including a name option, a root option, map option, namespace options and a null option.

Other features and embodiments of the present invention are described below.

BRIEF DESCRIPTION OF THE DRAWINGS

The file of this patent includes at least one drawing executed in color. Copies of this patent with color drawings will be provided by the United States Patent and Trademark Office upon request and payment of the necessary fee.

The systems and methods for transforming query results into hierarchical information in accordance with the present invention are further described with reference to the accompanying drawings in which:

FIG. 7B illustrates an example of ordering of subtrees when formulating a query in accordance with the invention; and FIG. 7C illustrates an example of generating an attribute containing a list of values in accordance with the present invention.

DETAILED DESCRIPTION OF THE INVENTION

Hardware Operating Environment

Figure 1:
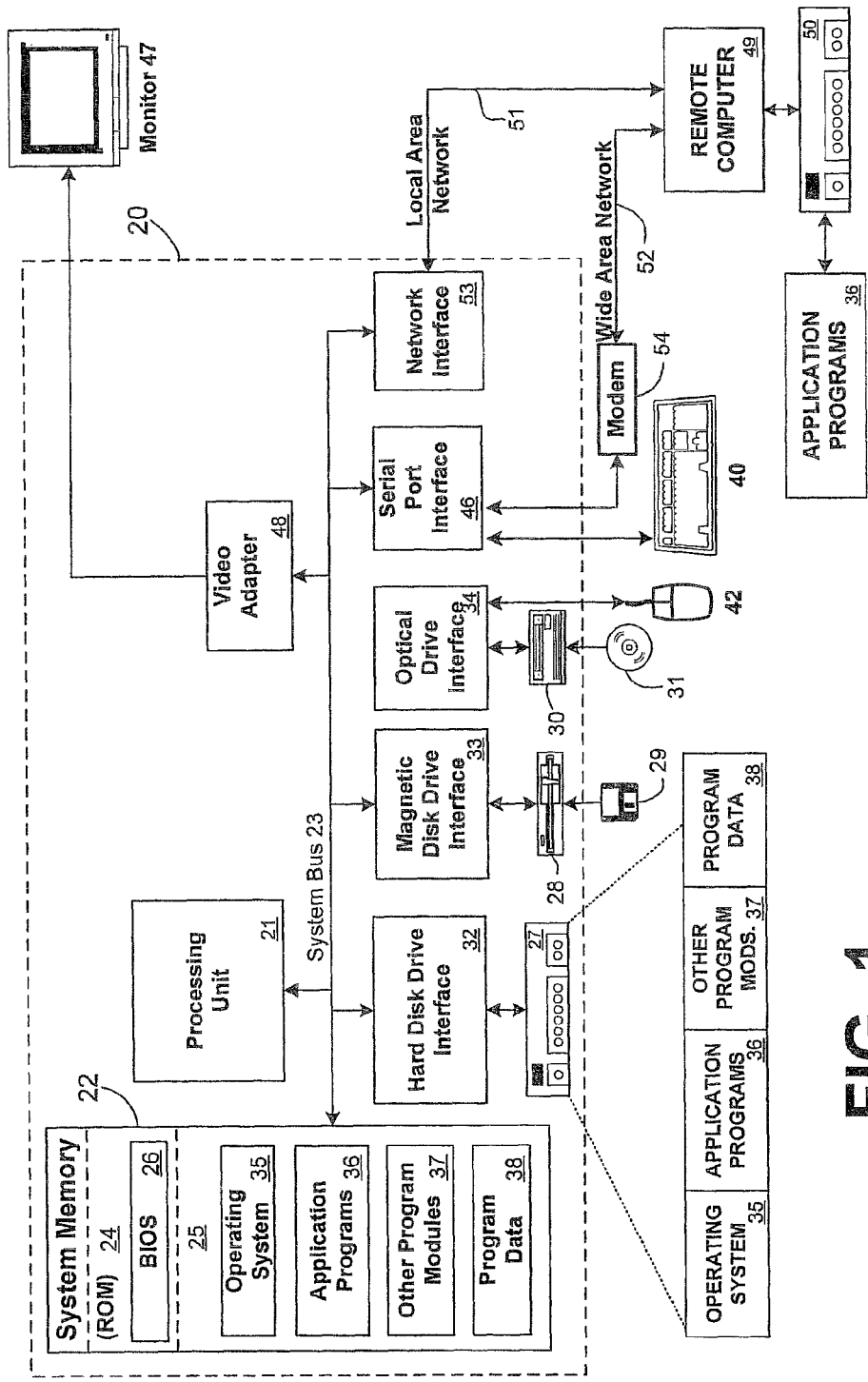
FIG. 1 illustrates example embodiments of a hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored or encoded in a machine readable medium such as the hard disk, magnetic disk 29, optical disk 31, ROM 24, RAM 25, or an electrical signal such as an electronic data stream through a communications channel, including an operating system 35, one or more application programs 36, other program modules 37, and program data 38. As described below in more detail, operating system 35 may allocate memory such as RAM 25 into kernel-mode memory or user-mode memory. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communications device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, an embedded computer or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Exemplary Embodiments of the Invention

The present invention includes embodiments of a computerized system and methods for processing a row producing query, such as SQL, and returning hierarchical data, such as an XML data stream. The SQL query provides several selectable modes of operation. In the "auto1" mode, elements of the relational schema, such as primary-foreign key information, are utilized to generate a hierarchical mapping of the rowsets for use in defining the organization of the information in the XML data stream. In the "auto2" mode, the ordering information of the tables as used in the query is utilized to generate a mapping of the rowsets into the XML data stream. Finally, in the "explicit" mode, information in the query explicitly defines the organization of the information in the SQL query. The syntax of the information in the SQL query that define an "explicit" mode query or the particular keywords selected to define the method of generating a rowset in the explicit mode are only design choices and may be expressed in a number of ways without limiting the present invention.

Figure 2:
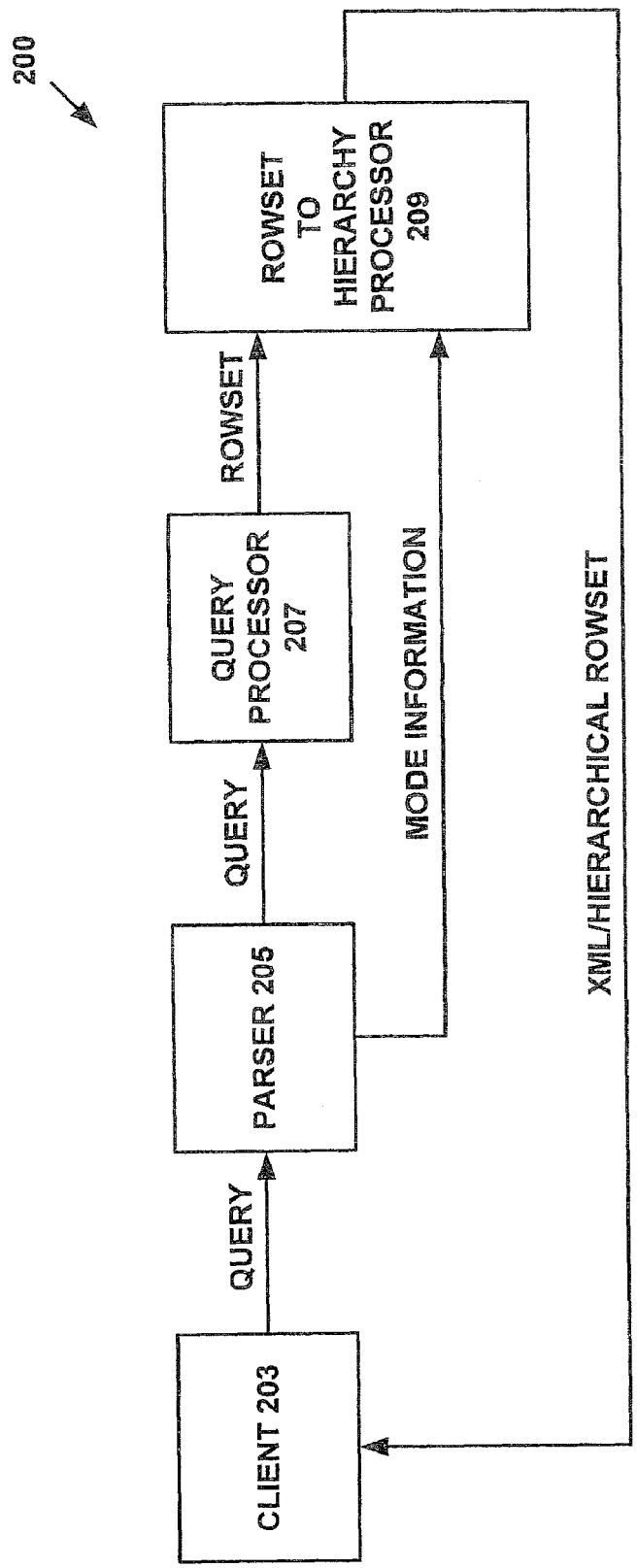
FIG. 2 is a block diagram of example embodiments of a computerized system for transforming query results into an XML data stream.

FIG. 2 is a block diagram of example embodiments of computerized system 200 for transforming query results into an XML data stream. An XML data stream is an unbuffered data stream. Although this example shows an unbuffered data stream, the present invention is not limited to use in connection with an unbuffered data stream. A buffered datastream may also be used in connection with the present invention. In one embodiment, computerized system 200 comprises client 203, parser 205, query processor 207, and rowset processor 209. For client 203 executing as a process on remote computer 49 as shown in FIG. 1 and for parser 205, query processor 207, and rowset processor 209 executing as processes on computer system 20 also as shown in FIG. 1, client 203 transmits a query to parser 205. Parser 205 strips mode information from the query and sends the mode information to rowset processor 209. Parser 205 also sends the query to query processor 207. Query processor 207 generates a rowset and sends the rowset to rowset processor 209. Rowset processor 209 processes the rowset received from query processor 207 and the mode information received from parser 205 to generate an XML datastream. The XML data stream is returned to client 203. In an alternate embodiment, client 203, parser 205, query processor 207, and rowset processor 209 all execute on the same computer system. In another alternate embodiment, parser 205, query processor 207, and rowset processor 209 are combined into a single software system. It is important to note that parser 205, query processor 207, and rowset processor 209 may operate on the same or a different computer. Alternatively parser 205 and query processor 207 may operate on a database server. Each of the operation modes of rowset processor 207 are described in greater detail below.

A particular XML mode of operation is communicated to database server 205 by defining the mode of operation in a SELECT statement. For example, the syntax for a SELECT statement requesting that the results of the query be returned as XML information under the "auto1" mode may be formed as follows:

```
SELECT . . .
FROM . . .
WHERE . . .
AND . . .
ORDER BY . . .
FOR XML auto1;
```

The syntax of the SELECT statement shown above is only one example of a syntax suitable for use in connection with the present invention. Any syntax that provides for specifying that XML information is to be returned and that provides for specifying a mode of operation is also suitable for use in connection with the present invention. In addition, the present invention is not limited to a syntax incorporating only flat queries. Nested queries, which are common in SQL statements, are also suitable for use in connection with the present invention.

The "auto2" mode is selected by substituting "auto2" for "auto1" in the SELECT statement shown above. Similarly, the "explicit" mode is requested by substituting "explicit for "auto1" in the SELECT statement shown above.

After a mode is set, the result of an SQL query is transformed into an XML data stream according to mode specific rules. If a schema is requested, it can be prepended to the returned XML data as inline schema.

The scope of the mode specification for each of the described modes, in one embodiment, is limited in several ways and only affects the final result. First, the selected mode is in effect only for the execution of the statement in which it is specified. Second the selected mode does not affect the form of the results of subqueries or user defined function calls.

For any SQL text column (type char, nchar, varchar, nvarchar, text, ntext) that is mapped to an attribute (or element in the case of the element-centric option), the attribute contains the entitized text. If the text column is a binary data column, the default is that the attribute (or element) contains a URI single object access query that allows the retrieval of the data. Inlined base 64 encoding is returned in any mode, if the option BINARY base64 is specified. In summary, to use one of the modes described above in a client program, in one embodiment, a "FOR XML" clause is included in a SELECT statement. Specifying "FOR XML" results in an XML data stream being returned to the client in response to the SELECT statement. A mode designation in the "FOR XML" statement further defines the rules by which the results of the SQL query are converted to an XML data stream. After the SELECT statement is executed, streamed XML is returned to the client. Schema for the returned XML may also be requested and prepended to the streamed XML data.

Figure 3:
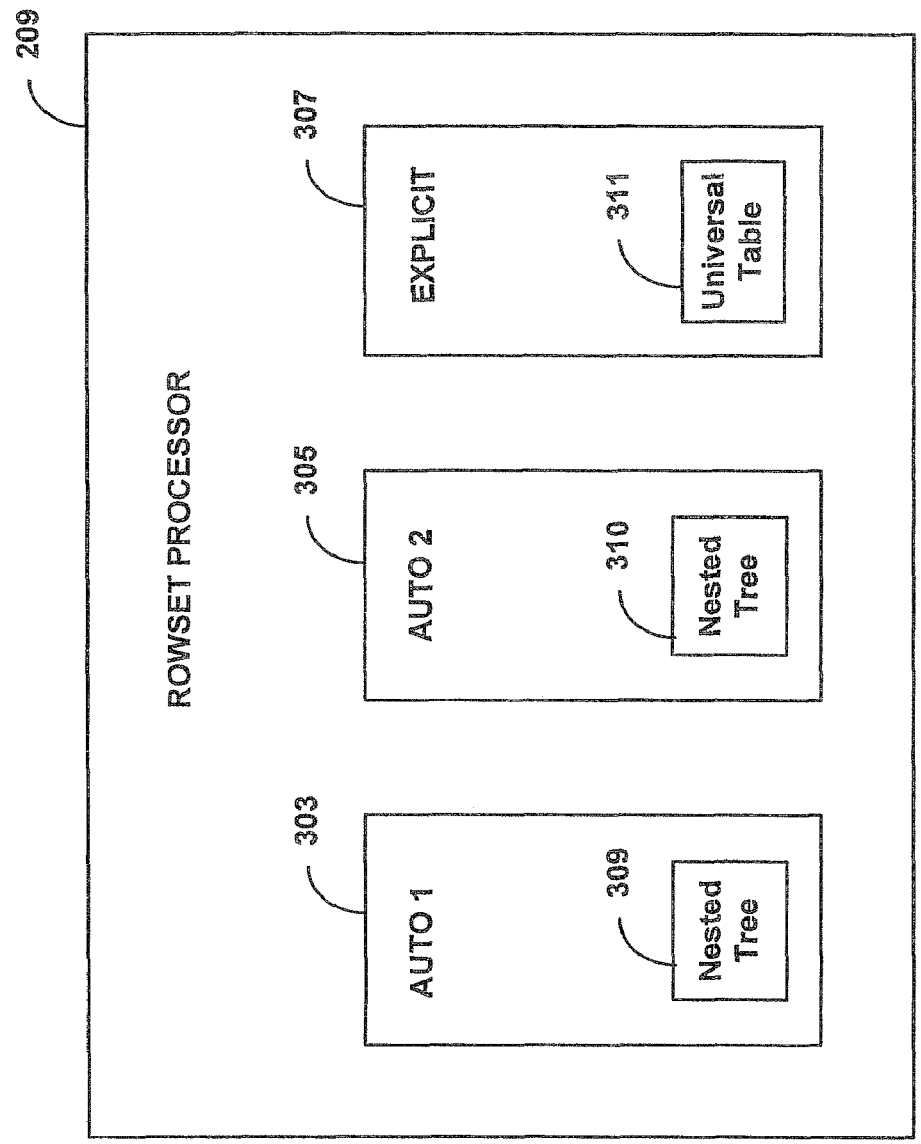
FIG. 3 is a block diagram of example embodiments of a rowset processor shown in FIG. 2.

Embodiments of the modes identified as "auto1" 303, "auto2" 305, and "explicit" 307 are shown in FIG. 3 as subsystems in rowset processor 209. "Auto1" 303 and "auto2" 305 include nested trees 309 and 310, respectively. Nested trees 309 and 310 are intermediate structures created during the generation of an XML data stream in the "auto1" 303 and "auto2" 305 modes. Universal table 311 is an intermediate structure created during the generation of an XML data stream in the "explicit" 307 mode. Universal table 311 is described in more detail below. Rowset processor 207 is not limited to a particular combination of modes. One or more of the listed modes may be included in rowset processor 207. A more detailed description of each mode is provided below.

Auto1 Mode

In one embodiment of the "auto1" 303 mode, each rowset returned from a query is transformed into a nested XML tree 309, which defines an XML data stream.

The transformation maps table and column information into the XML data stream. Each table listed in the SELECT clause that has at least one column in the query result is represented as an XML element. The table name (or alias if provided) maps to the XML element name. The column name (or alias if provided) maps to an attribute name or non-complex subelement. The default "auto1" 303 mode in one embodiment maps table columns to XML attributes.

The transformation also determines the correct organization or nesting of information included in the XML data stream. Each column in the query result or rowset is associated with a table. This provides a collection of tables participating in the query. A primary-foreign key graph is generated from the primary-foreign key relationships identified in the collection of tables. The organization of the graph is determined by examining the system catalog information.

Figures 4A, 4B:
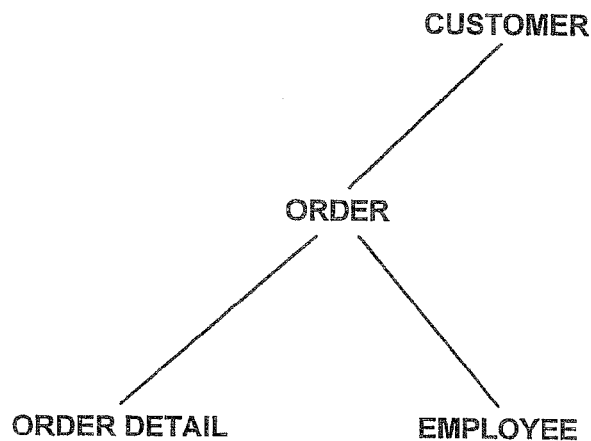
FIG. 4A is an illustration of a nested tree shown in FIG. 3.
FIG. 4B is an illustration of an XML representation of the nested tree shown in FIG. 4A.

FIG. 4A is an illustration of an example embodiment of a nested tree associated with the "auto1" 303 mode shown in FIG. 3. FIG. 4B is an illustration of an XML data stream derived from the nested tree shown in FIG. 4A. The indentations in the illustrated XML data stream indicate the nesting of the data stream elements. As can be seen by comparing FIG. 4A with FIG. 4B, the nesting of the XML data stream matches the nesting defined by the tree shown in FIG. 4A.

Some attributes and columns are considered separately from the tables for the purposes of determining the correct nesting. If an attribute of a table reference appears after the first occurrence of the table reference, then the attribute is added to the nesting level associated with the first occurrence of the table reference. If a column in the selected rowset cannot be associated with a table (e.g. it is an aggregation or a computed column), the column is added to the deepest nesting level in place at the time the column is encountered. If such a column appears as the first element, it is added to the top element.

Ensuring the correct nesting for a many-to-many, a many-to-one, or multiple one-to-many relationships is achieved by arranging the order of the tables included in the SELECT statement to generate the desired result. Alternatively, if the first table is taken as a container, then all other relationships are disregarded. In a second alternative, if a relational schema provides information about cascading delete constraints, then the cascading delete constraints is taken to indicate nesting. In a relational system, a cascading delete constraint permits specifying that children of a parent are automatically deleted, if the parent is deleted.

In one embodiment, an ELEMENTS option is provided for use with the "auto1" 303 mode and the alternative modes described below. Selecting the ELEMENTS option causes table columns to be returned as non-complex subelements.

Auto2 Mode

In one embodiment, the operation of the "auto2" 305 mode is similar to the operation of the "auto1" 303 mode. However, one difference between the operation of the two modes is that the "auto2" 305 mode does not rely on primary-foreign key relationships to determine the correct nesting for the XML data stream. The nesting for the XML data stream in the "auto2" 305 mode is determined by the left-to-right ordering of the tables listed in the SELECT clause of the query. The first table listed maps to the top level element, and each table listed after the first table is nested within the preceding element. For example, for a three table list, the first table maps to the top level element. The second table listed is the second element and is nested within the top level element. And the third table listed is the third element and is nested within the second element.

Each table included in a query and that has at least one column in the query result is represented as an XML element. A table name (or alias if provided) maps to the XML element name. A column name (or alias if provided) maps to an attribute name or non-complex subelement name, if the ELEMENTS option is specified. The "auto2" 305 mode, in one embodiment, uses the first appearance, when reading from left to right, of a table in the select clause to determine the nesting level for the table. The left-outermost table is the top element, the second left-outermost table is nested within the top element, etc. If an attribute for a table reference appears later, it is added to the level of its table reference instead of opening a new level. If a column in the selected rowset cannot be associated with a table (e.g. it is an aggregation or a computed column (even if based on the same table)), the column is added to the deepest nesting level in place when the column is encountered in the list. If such a column appears as the first element, it is added to the top element. If the user specifies * as the sole entry in the selection clause, the nesting is determined as described above, based on the order in which the rows are returned by the query engine.

For example:

```
SELECT C.customerid, 'foo' as bar, O.orderid, C.contactname as
name, O.orderdate as date
    FROM Customers C left outer join Orders O on C. customerid =
    O.customerid
    ORDER BY C.customerid
    FOR XML auto2
    Results in the following XML data:
    <C customerid="..."bar="foo" name="...">
        <O orderid="..." date="..."/>
    </C>
```

The "auto2" 305 mode can also express nesting against the 1:n direction (e.g. to deal with m:n relationships such as Address<->Customer). A user can specify whether to group customers according to addresses or to group addresses according to customers. This is accomplished by positioning the tables in the select list accordingly.

The heuristics can use primary key-foreign key information, if available, to determine when a new element is generated. If the executed query plan does not provide the desired ordering of the rows, then in order to get the desired ordering, the use of order by clauses is recommended.

The "auto2" 305 mode, in one embodiment, is also capable of supporting several features related to names, views and subselects, and schemas. Names are changed by renaming the columns and the tables in the SQL statement. Some names may need to be translated into valid XML names. Views and subselects, in a FROM clause, are treated like tables. A set operation query only returns a schema based on the first selection of the union.

Explicit Mode

The "explicit" 307 mode embodiment permits a developer to process a specific rowset format that is then transformed to hierarchical data, such as XML. In the "explicit" 307 mode, information defining the nesting of the requested data and information defining the naming of the requested columns is explicitly included in the query.

Figure 5:
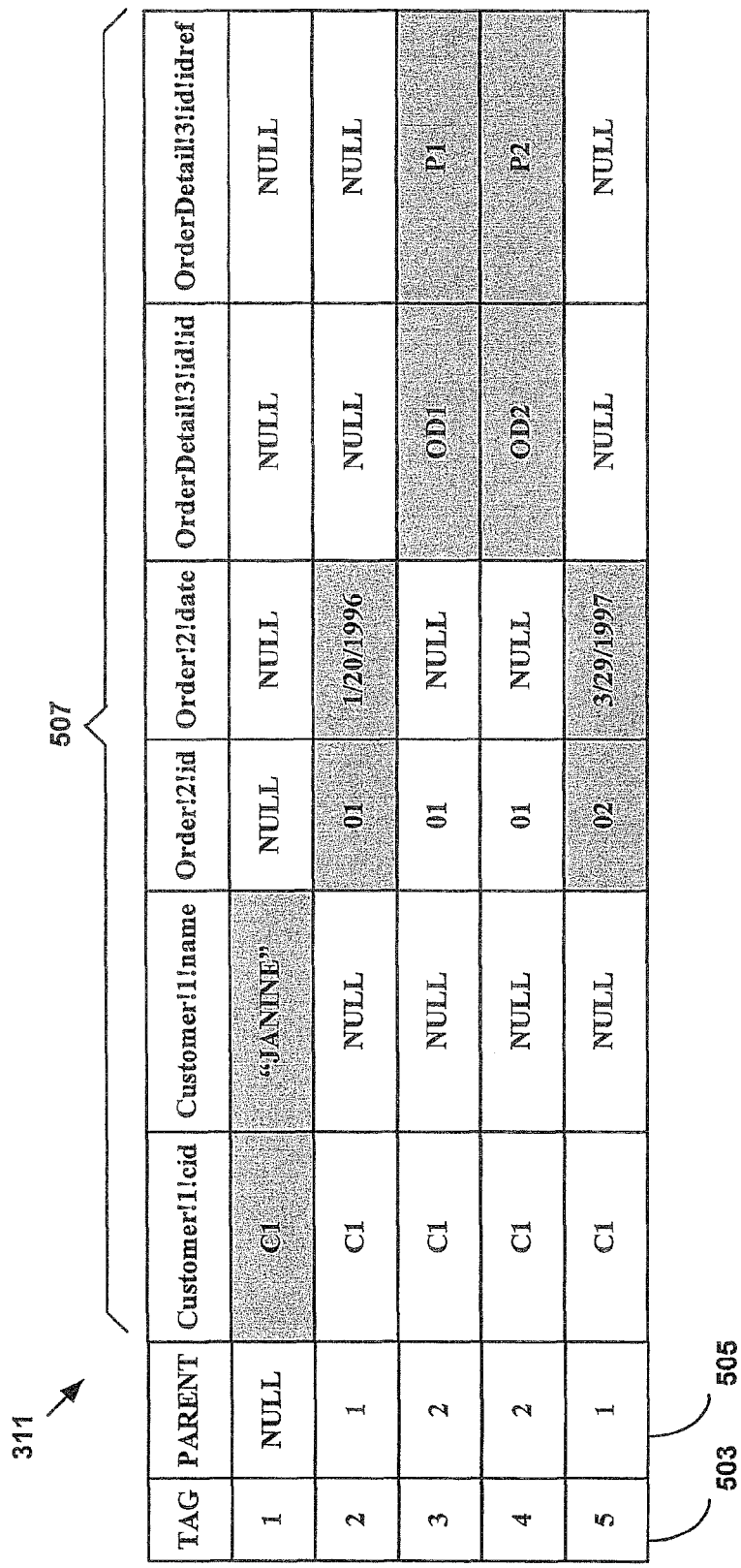
FIG. 5 is an example diagram of a universal table of FIG. 3.

In the "explicit" 307 mode example embodiment, a query is constructed to generate a universal table. A universal table includes meta data columns for element tags and meta data columns for parent tags. A universal table also encodes the XML generic identifiers and attribute names in the table column names. Once the element tags and the parent tags are added to a universal table, the universal table fully describes an XML data stream. The present invention is not limited to use with a particular universal table format. Hierarchical results, such as XML data can be produced from a number of universal table formats. FIG. 5 shows a tagged universal table having a simple Customer, Order, OrderDetail nesting.

A universal table is generated, in one embodiment, by applying a union over all selections that retrieve the desired element information. Each selection, in addition to the requested data columns, includes a tag number (>0) in a column named Tag and a parent tag number (>=0 or NULL) in a column named Parent. A parent tag number of zero or null indicates that a row is located directly under the top level element. In one embodiment, the tag column is the first column in the universal table and the parent column is the second column in the universal table. Each tag having a specific number is associated with only one parent number. To allow streaming of the result through an XML translator, the universal table is ordered by the element identifiers.

Referring to FIG. 5, the data in the illustrated embodiment of universal table 311 is vertically partitioned into groups that become XML elements in the result returned from the query. In this example, the results are the data shown in dashed boxes. Columns 503 and 505 contain the Tag and Parent numbers used for determining the nesting of the XML data stream. Column 507 contains data for inclusion in the XML data stream.

In one embodiment, the generic identifiers (GI), tag numbers, attribute names, and directives are encoded in the column names as GI!TagNumber!AttributeName! Directive. A generic identifier provides the resulting element's generic identifier, which for example universal table 311 shown in FIG. 5 is Customer and Order. The generic identifier may also be empty. An empty generic identifier produces no mark-up tags. TagNumber in combination with the Tag column and the Parent column defines the nesting of the resulting XML data. The Tag column provides the currently "active" tag number for each row, and the Parent column provides the tag number of the parent element for the row. AttributeName provides the name of the XML attribute (if directive is not set) or the name of the contained element (if directive is either xml, element or xmltext). In the later case, AttributeName can be empty. In the case where AttributeName is empty, the values contained in the column are directly contained by the element with the specified generic identifier. Specifying a directive is optional and is used to encode type information, such as ID/IDREF(S), by using the keywords id, idref, and idrefs, respectively, and to indicate how text data is mapped to XML using the keywords hide, element, xml, xmltext, and cdata.

Each of the keywords hide, element, xml, xmltext, and cdata provide alternate embodiments for including text and XML data in the XML data stream. The hide keyword blocks display or transmission of the associated attribute. The element keyword triggers the generation of a contained element with the specified name (or contain directly if no AttributeName is specified). In addition, the contained data is entitized. Entitization in XML uses specific markup to encode the standard markup characters such as <, >, &, ', ", so that the parser does not try to interpret them as markup. The xml keyword triggers the generation of a contained element with the specified name (or contain directly if no AttributeName is specified). However, unlike the element keyword, the contained data is not entitized. The xmltext keyword assumes the wrapping of column content by a single tag that is integrated with the rest of the document. If an AttributeName is specified, the name of the tag is replaced by the specified name, otherwise, the attributes are appended to the current list of attributes of the enclosing element and the content is placed without entitization at the beginning of the containment. If an attribute appears in the xmltext element that conflicts with an attribute that is retrieved on the same element level, the attribute in the xmltext is ignored and overwritten. The cdata keyword triggers containment of data by wrapping it with a CDATA section. The content is not entitized.

If no directive is provided, an attribute is specified. If no attribute name is specified and no directive is specified, an element directive is implied and the data is contained. Directives influence the generation of schemas in several ways. First, during the generation of schemas, the data types are inferred from the table attribute datatypes unless a datatype directive such as id, idref, idrefs, nmtoken, or nmtokens is specified. Second, none of the xml or xmltext subelements or attributes are added to the schema, however they imply an open content model. Third, the specified directives are also used to generate nesting information for the schema.

Hierarchical Information Formatting Function

Alternative Embodiments

In further embodiments of the invention, a hierarchical information formatting or aggregating function, e.g., XML formatter or aggregator, is provided that is accepted everywhere a function that results in an XML datatype is accepted. For instance, for use in connection with SQL, the following non-limiting exemplary syntax may be utilized to replace, or supplement, the above-described embodiments relating to the functionality of the FOR XML function:

XML(rowsetexpr[, Options])

where rowsetexpr is any valid relational database select statement (including order by clause, excluding group by clause). Since nesting of formatters is allowed inside select statements, these rowset expressions are basically subqueries that can correlate to their containing queries. Options indicates one or more of the following options:

```
name="QName"
root="QName"
map = (element | attribute | path)
namespace NCName = "anyURI" | default namespace = "anyURI"
null = (absent | xsinil | empty)
```

Multiple options are comma-separated. The option keywords are case-insensitive.

QName is a valid XML, QName according to the QName productions in http://www.w3.org/TR/REC-xml-names/#NT-QName, NCName is a valid XML NCName according to the NCName productions in http://www.w3.org/TR/REC-xml-names/#NT-NCName and anyURI is any valid universal resource identifier (URI).

Examples of the use of the XML formatting or aggregating function are as follows:

```
XML(select * from Customers)
XML(select * from Customers, name="foo:Customer",
map = attribute, namespace foo ="http://example.com", null=xsinil)
```

Semantically, the XML formatting or aggregating function transforms a rowset into an XML datatype instance by mapping each row into an element.

In various non-limiting embodiments of the invention, if no options are specified, default behavior of the XML formatting or aggregating function is to map every row in the rowset to an XML element as follows:

(1) If the rowset is empty, the XML datatype is NULL (and not empty), (2) Every row maps to an element in the order the rows are returned. The name of the element that represents the row is 'row'. In this regard, the generated element name for the rows can be overwritten by the name option, (3) Every column maps to a subelement of the row element in the order the columns appear in the rowset as follows, which can be overwritten with the map options: (a) A NULL value in a column by default maps to the absence of the subelement, which can be overwritten with the null option. (b) Any column without a name is inlined. If the column type is XML, then it inserts the content of the XML datatype instance (document nodes are dropped); otherwise, it is inserted as a text node. (c) Any column with a name is mapped case-sensitive to a subelement whose name is the partially encoded column name according to the name encoding scheme (See, e.g., section 7.1 of ISO SQL/XML with amendment ICN-25) and (4) Values of cells are mapped by following the type-sensitive mapping of relational values to XML values (See, e.g., section 7.16 of ISO SQL/XML) and based on existing FOR XML/XQuery value serialization. Binary columns are exposed in base64 encoding.

Three examples follow:

```
I.
XML(select A.x, B.y from A join B on A.id=B.a)
returns:
<row>
 <x>...</x>
 <y>...</y>
</row>
<row>
 <x>...</x>
 <y>...</y>
</row>
...
II.
XML(
SELECT customerid as "id", customername, street
FROM Customers
)
returns:
<row>
 <id>ALFKI</id>
 <customername>...</customername>
 <street>...</street>
</row>
...
III.
XML(
SELECT customerid as "@id", customername, street as "address/street",
zipcode as "address/zip", city as "address/city"
FROM Customers, name="Customers", map=element
)
returns:
<Customers>
 <_x0040_id>...</_x0040_id>
 <customername>...</customername>
 <address_x002F_street>...</address_x002F_street>
 <address_x002F_zip>...</address_x002F_zip>
 <address_x002F_city>...</address_x002F_city>
</Customers>
...
```

As mentioned, the syntax of the XML formatter or aggregator, or formatting or aggregating function, in accordance with presently described embodiments has optional arguments including: a name option, a root option, map option, namespace options and a null option. Semantically, they are used as follows:

The name option enables overwriting the name of a row element. Its value is case-sensitive and follows the QName rules according to http://www.w3.org/TR/REC-xml-names/#NT-QName, or else is empty. If the value of the name option is not a valid QName or an empty string, an error is raised.

If the lexical representation of the QName includes a namespace prefix, the namespace prefix is bound to a namespace URI using the namespace option, described in more detail below.

If the QName is an empty string, then the row element tag and any potentially contained attributes are dropped.

Four exemplary usages of the name option are as follows:

```
I.
XML(select A.x, B.y from A join B on A.id=B.a, name="join")
which returns:
<join>
 <x>...</x>
 <y>...</y>
</join>
...
II.
XML(select A.x, B.y from A join B on A.id=B.a, name="n:join")
which raises an error indicating that the namespace prefix is not defined.
III.
XML(select A.x, B.y from A join B on A.id=B.a, name="n:join",
namespace n="http://example.com")
which returns:
<n:join xmlns:n="http://example.com">
 <x>...</x>
 <y>...</y>
</n:join>
...
IV.
XML(select A.x, B.y from A join B on A.id=B.a, name="")
which returns:
 <x>...</x>
 <y>...</y>
 <x>...</x>
 <y>...</y>
...
```

The root option is utilized to wrap the row elements with a single element tag. Its value is case-sensitive and follows the QName rules according to http://www.w3.org/TR/REC-xml-names/#NT-QName. If it is not a valid QName, an error is raised.

If the lexical representation of the QName includes a namespace prefix, the namespace prefix is bound to a namespace URI using the namespace option, described in more detail below.

Three exemplary usages of the root option include:

I.
XML(select A.x, B.y from A join B on A.id=B.a, root="root")
which returns:
<root>
 <row>
  <x>...</x>
  <y>...</y>
 </row>
 <row>
  ...
</root>
II.
XML(select A.x, B.y from A join B on A.id=B.a, root="n:root")
which raises an error indicating that the namespace prefix is not defined.
III.
XML(select A.x, B.y from A join B on A.id=B.a, root="n:root",
name="n:join", namespace n="http://example.com")
which returns:
<n:root xmlns:n="http://example.com">
 <n:join>
  <x>...</x>
  <y>...</y>
 </n:join>
 ...
</n:root>

The map option enables overwriting of the default element-centric (element) row mapping described above with an attribute-centric (attribute) mapping or a mapping interpreting the names as paths (path). In one embodiment, only one of these map options can be specified per the XML formatting or aggregating function. If more are specified, an error is raised. It is noted that the map option can be implemented in connection with the embodiments relating to the FOR XML described above. Moreover, the explicit, auto1 and auto2 modes described above can be implemented as map options in the presently described embodiments.

The "map=element" option maps all rows to subelements regardless of the presence of '@' or '/'. The names are partially encoded. The "map=element" option is the default behavior.

The "map=attribute" option maps all rows to attributes regardless of the presence of '@' or '/'. The names are partially encoded. A NULL value in a column by default maps to the absence of the attribute. This can be overwritten with the null option.

If a column has no name, an error is raised. If more than one attribute receives the same name, an error is raised. Also, if the datatype of the row cannot be mapped to an attribute (e.g., because it contains an XML subtree), then an error is raised. If a column name starts with xmlns, an error is raised.

The "map=path" option maps columns in the order they appear in the rowset to attributes or subelements by interpreting the column names as a path according to the following rules:

Any column without a name is inlined. If the column type is XML, then the content of the XML datatype instance is inserted, while dropping document nodes; otherwise, it is inserted as a text node.

Any column with a name is mapped case-sensitive in the following way:

If the name does not start with a '@' or does not contain a '/', an XML element that is a subelement of the row element containing the column value is created. The subelement name is the partially encoded column name according to the name encoding scheme (See, e.g., section 7.1 of ISO SQL/XML with amendment ICN-25, hereby incorporated by reference).

If the name starts with a '@' and does not contain a '/', an attribute of the row element containing the column value is created. The attribute name is the partially encoded column name without the leading '@' according to the name encoding scheme.

If more than one attribute receives the same name, an error is raised. Also, if the datatype of the row cannot be mapped to an attribute (e.g., because it contains an XML subtree), then an error is raised.

In one embodiment, attributes come before elements on the same level. Otherwise, an error is raised.

If an attribute name starts with the prefix xmlns, an error is raised to avoid dynamic setting of namespace declarations.

If the name does not start with a '@' and contains a '/' then the name indicates a hierarchy. Assuming a name is broken into $name_1/name_2/\ldots/name_n$. Then each $name_i$ ($1<=i<n$) represents an element that is nested under the current row element (i=1) or under the element with the name $name_{i-1}$. If name; (i<n) starts with '@', then an error is raised. $name_n$ is mapped to an attribute of $name_{n-1}$ if it starts with a '@' or a subelement otherwise. See, e.g., above rules and sub rules relating to case-sensitive mapping columns with a name. All names are partially encoded.

If the name starts with a "/", the "/" is disregarded.

If several subsequent columns share the same path prefix, they are grouped together under the same elements. If a column with a different name is occurring in between, it breaks the grouping.

A NULL value in a column per default maps to the absence of the leaf attribute or subelement, which can be overwritten with the null option. Any elements added by the rule pertaining to the scenario wherein the name does not start with a '@' and contains a '/' are always inserted.

Five exemplary uses of the map option include:

I.
XML(
SELECT customerid as "@id", customername, street as "address/street",
zipcode as "address/zip", city as "address/city"
FROM Customers, map = path
)
which returns:
<row id="ALFKLI">
 <customername>...</customername>
 <address>
  <street>...</street>
  <zip>...</zip>
  <city>...</city>
 </address>
</row>
...
II.
XML(
SELECT customerid as "@id", street as "address/street", customername,
zipcode as "address/zip", city as "address/city"
FROM Customers, map = path
)
which returns:
<row id="ALFKI">
 <address>
  <street>...</street>
 </address>
 <customername>...</customername>
 <address>
  <zip>...</zip>
  <city>...</city>
 </address>
</row>
...
III.
XML( -continued

```
SELECT customerid as "@id", customername, street as "address/street",
zipcode as "address/zip", "", city as "address/city"
FROM Customers, map= path
)
which returns:
<row id="ALFKI">
 <customername>...</customername>
 <address>
  <street>...</street>
  <zip>...</zip>
 </address>
 <address>
  <city>...</city>
 </address>
</row>
...
IV.
XML(
SELECT customerid as "@id", customername, street as "address/street",
zipcode as "address/zip", city as "address/city"
FROM Customers, name="Customers", map=element
)
which returns:
<Customers>
 <_x0040_id>...</_x0040_id>
 <customername>...</customername>
 <address_x002F_street>...</address_x002F_street>
 <address_x002F_zip>...</address_x002F_zip>
 <address_x002F_city>...</address_x002F_city>
</Customers>
...
V.
XML(
SELECT customerid as "@id", customername, street as "address/street"
FROM Customers, map=attribute, name="Customers"
)
which returns:
<Customers _x0040_id="..." customername="..."
       address_x002F_street="..." />
...
```

The namespace options provide a way to associate a namespace to a prefix or a default namespace. The syntax for a namespace option is as follows:

namespace NCName="anyURI"|default namespace="anyURI"

where NCName is a valid XML NCName according to the NCName productions in http://www.w3.org/TR/REC-xml-names/#NT-NCName and anyURI is any valid namespace URI.

If the same prefix is being associated more than once in the same XML formatting or aggregating function, an error is raised.

The namespace declaration is added to the outermost XML element returned by the XML formatter or aggregator, or XML formatting or aggregating function. If there is more than one top-level XML element, it is added to all the top-level elements.

It can be appreciated that an XML formatter or aggregator nested within another XML formatter or aggregator inherits all namespace associations and is allowed to overwrite them. See, e.g., below the descriptive material relating to XML formatter or aggregator nesting.

If anyURI is an empty string in the case of a default namespace declaration, then the default namespace prefix is undefined. This can be used to overwrite an inherited default namespace.

Two exemplary uses of the namespace options are as follows:

I.
```
XML(select A.x as "o:x", B.y from A join B on A.id=B.a, name="n:join",
namespace n="http://example.com",
default namespace ="http://example.com/1",
namespace o="http://example.com/2")
which returns:
<n:join xmlns="http://example.com/1"
    xmlns:o="http://example.com/2"
    xmlns:n="http://example.com">
 <o:x>...</o:x>
 <y>...</y>
</n:join>
...
```

In this first example, it is noted that the y element is associated with the default namespace.

II.
```
XML(select A.x as "o:x", B.y from A join B on A.id=B.a, name="n:join",
attribute-centric, namespace n="http://example.com",
default namespace ="http://example.com/1",
namespace o="http://example.com/2")
which returns:
<n:join xmlns="http://example.com/1"
    xmlns:o="http://example.com/2"
    xmlns:n="http://example.com"
    o:x="..." y="..." />
...
```

In this second example, it is noted that the y attribute is not associated with the default namespace.

The null option overwrites the default mapping of NULL values described above. Only one of the options can be specified per XML formatter or aggregator. If more than one is specified, an error is raised.

The null option provides three values: absent, xsinil, or empty.

The "absent" value is the default behavior. A NULL value results in the absence of its containing attribute or subelement.

The "xsinil" value adds the namespace declaration for the XML Schema instance namespace URI xmlns:xsi="http://www.w3.org/2001/XMLSchema-instance" and adds xsi:nil="true" to every subelement that represents a cell containing NULL. If the cell/column is mapped to an attribute while xsinil is specified, the attribute is still absent.

The "empty" value represents the NULL value with an empty string as the value of the attribute or subelement.

The null option also impacts the NULL handling of the root element if one has been specified.

TABLE I

Exemplary tables A and B

| A | | B | |
|---|---|---|---|
| id | x | A | y |
| 1 | 1 | 1 | 2 |
| 2 | NULL | 1 | NULL |
| 3 | 2 | 2 | 1 |

Based on the two tables A and B in Table I above, six exemplary uses of the null option are presented below:

I.
XML(SELECT A.x as "@x", B.y FROM A LEFT OUTER JOIN B ON A.id =B.a)
is the same as:
XML(SELECT A.x, B.y FROM A LEFT OUTER JOIN B ON A.id =B.a, null=absent)
both of which return:
<row x="1"><y>2</y></row>
<row x="1"/>
<row><y>1</y></row>
<row x="2"/>
II.
XML(SELECT A.x, B.y FROM A LEFT OUTER JOIN B ON A.id =B.a, null=xsinil)
which returns:
<row x="1" xmlns:xsi=""><y>2</y></row>
<row x="1" xmlns:xsi=""><y xsi:nil="true"/></row>
<row xmlns:xsi=""><y>1</y></row>
<row x="2" xmlns:xsi=""><y xsi:nil="true"/></row>
III.
XML(SELECT A.x, B.y FROM A LEFT OUTER JOIN B ON A.id =B.a, null=empty)
which returns:
<row x="1"><y>2</y></row>
<row x="1"><y/></row>
<row x=""><y>1</y></row>
<row x="2"><y/></row>
IV.
XML(SELECT A.* FROM A WHERE 0=1)
which returns
NULL
V.
XML(SELECT A.* FROM A WHERE 0=1, root="root")
which returns the empty XML datatype instance (since the root element is absent).
VI.
XML(SELECT A.* FROM A WHERE 0=1, null=empty, root="root")
which returns:

XML formatters or aggregators can be nested to achieve nested XML trees. If they are nested inside selections, they have access to the externally bound variables for correlation purposes.

Figure 6A:
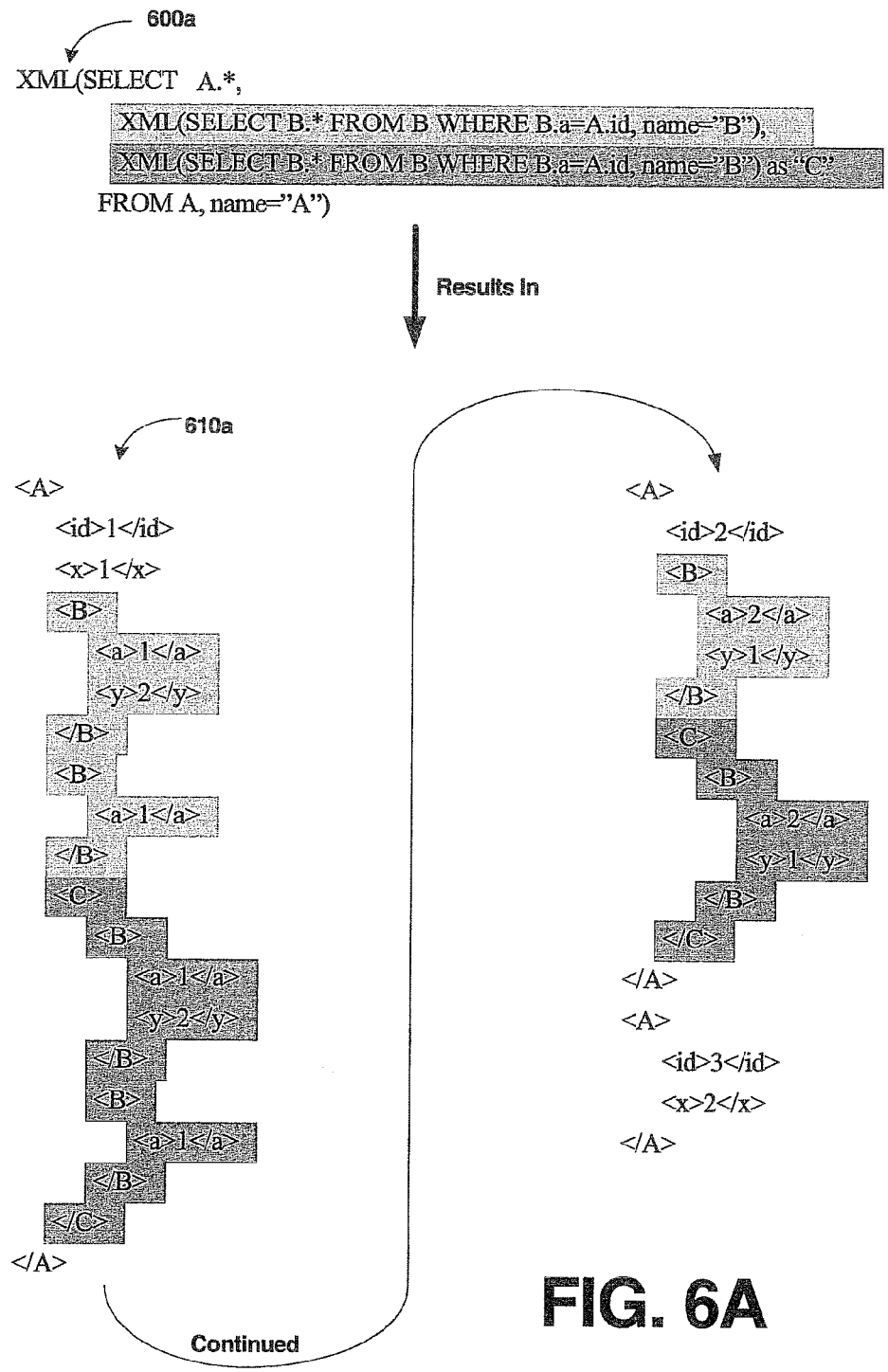
FIG. 6A illustrates exemplary use of nested XML formatters or aggregators in accordance with an alternative embodiment of the invention.

Based upon tables A and B in Table I, exemplary use of nested XML formatters or aggregators to achieve nested XML trees is depicted in FIG. 6A wherein XML formatter code 600a results in XML 610a. The yellow, red and lavender highlighting in code 600 and hierarchical information 610a are correlated.

Since the formatter acts as a computed column, the first formatter call is not wrapped in an XML column element. Since it returns a NULL XML datatype instance if the input rowset is empty, the second formatter call will return an absent C element for the last C. This could be overwritten with the null option to either get an element C with empty content or with the xsi:nil attribute set.

Figure 6B:
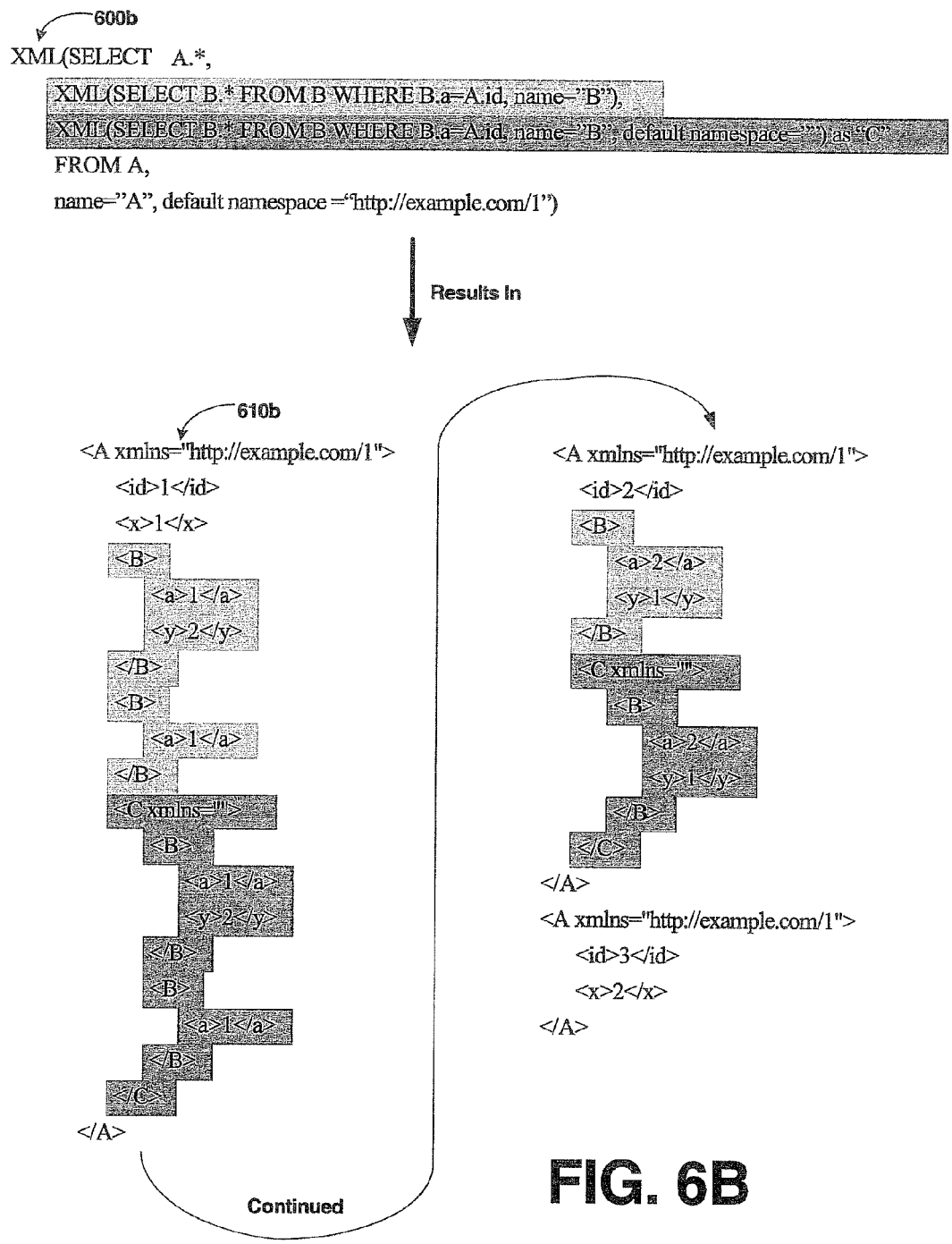
FIG. 6B illustrates the exemplary use of namespaces in an XML formatter or aggregator operation in accordance with the invention.

Namespaces (including default namespaces) are inherited in contained XML subtrees. An explicit "undeclare" is added if the outermost formatter declares a default namespace and the innermost data is be kept outside of the default namespace. For example, FIG. 6B illustrates the exemplary use of namespaces in an XML formatter operation in accordance with the invention. Once again, the yellow, red and lavender highlighting in XML formatter code 600b and hierarchical information 610b are correlated.

Figure 7A:
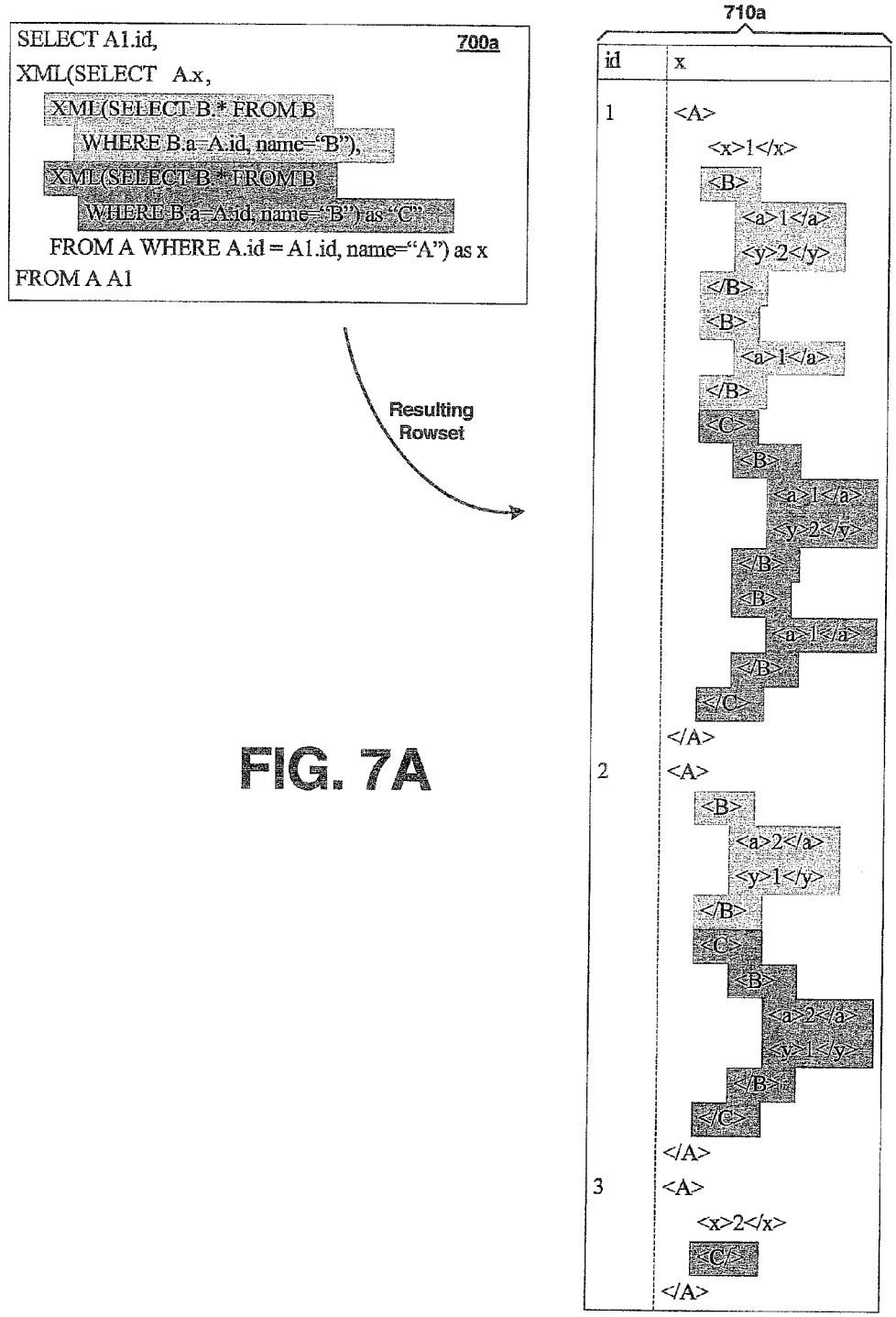
FIG. 7A illustrates an example of partitioning resulting hierarchical information into rows in accordance with the invention.

FIGS. 7A to 7C illustrate some exemplary scenarios to further illustrate use of hierarchical information formatting function of the invention. For instance, FIG. 7A illustrates an example of partitioning the hierarchical information into rows. Thus, given tables A and B presented in Table I above, formatting code 700a generates hierarchical information 710a.

FIG. 7B illustrates an example of ordering of subtrees when formulating a query 700b in accordance with the invention. Given tables A and B in tables 720a and 720b, respectively, code 700b generates hierarchical information 710b.

FIG. 7C illustrates an example of generating an attribute containing a list of values in accordance with the present invention. In this regard, given tables A and B of tables 730a and 730b, respectively, code 700c generates hierarchical information 710c.

In various embodiments, the invention optionally includes a variety of features. For instance, a default XML view over relational data can be defined. Thus, XML(SELECT*FROM X, map=element, name="X", name_enc=full) can represent the default XML view over a relational database.

With respect to adding inline schema, the invention can be augmented with an Addschema function as follows:

Addschema(XML): XML which infers inline schema and prepends it to the XML, while recognizing and avoiding namespace collisions.

With respect to adding functionality relating to "empty" and "absent" on a per column basis, the invention optionally extends xsinil, whereby empty and absent take names of columns to individually indicate NULL mapping. For instance, the following exemplary pseudocode is illustrative:

XML(select a, b, c, d as "@d" from T,
    null=xsinil(a), null=empty(b,@d), null=absent(c))

With respect to name encoding, the invention adds an option to set name encoding to fall, which may be parameterized by column.

With respect to implementing a droptag on a per column basis, the invention adds an option to drop a containing element tag (with contained attributes). For instance, the following exemplary pseudcode:

```
XML(select a, b from T,
    droptag(a))
``` results in the following hierarchical information:

<row>aval<b>bval</b></row>

To indicate binhex instead of base64 encoding, the invention adds an option to change base64 to binhex encoding. For instance, the following exemplary pseudocode:

```
XML(select a, b from T,
    binary= binhex(a))
``` results in the following hierarchical information:

<row><a>binhexencodedaval</a><b>bval</b></row>

Lastly, a hide option can be implemented to hide rows that are passed from SELECT. This may be useful, for instance, when operating over a SELECT GROUP BY to drop otherwise required columns.

There are multiple ways of implementing the present invention, e.g., an appropriate API, tool kit, driver code, operating system, control, standalone or downloadable software object, etc. which enables applications and services to use the query and query result transformation techniques of the invention. The invention contemplates the use of the invention from the standpoint of an API (or other software object), as well as from a software or hardware object that communicates in connection with requesting any kind of data. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to retrieve data. Thus, the techniques in accordance with the present invention may be applied to a variety of applications and devices. For instance, the algorithm(s) and hardware implementations of the invention may be applied to the operating system of a computing device, provided as a separate object on the device, as part of another object, as a reusable control, as a server object, as an application programming interface, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. Moreover, it can be appreciated that many of the examples illustrated and described herein show an expression and/or its result, but not a full statement. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the data transformation techniques of the present invention, e.g., through the use of a data processing API, reusable control, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Further, as used herein, the term "module" shall mean any hardware, firmware or software component, or any combination thereof. In addition, the term "database server" includes not only relational database servers, but also other database servers, such as object oriented database servers. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for generating a hierarchical data stream, comprising:

receiving a query at a parser, the query including at least one database statement utilized by a query processor that retrieves at least one rowset from a database, the query also including mode information, wherein the parser extracts the mode information from the query during parsing;

processing the query at the query processor to retrieve the at least one rowset from the database; and transforming at a rowset to hierarchical processor a rowset of the at least one rowset into a datatype instance of a hierarchical language of the hierarchical data stream by mapping each row element of a rowset of the at least one rowset into an element of the hierarchical data stream based on the mode information received by the rowset to hierarchical processor from the parser, wherein the mode information includes a first mode in which the processor transforms the rowset into a nested tree that defines the hierarchical data stream based on, at least in part, mapping table information included in the query to one or more elements of the hierarchical data stream as a function of primary-foreign key relationships identified in the table information, wherein receiving includes receiving a query including at least one valid database statement used to retrieve at least one rowset from a database and at least one of a name option parameter, a root option parameter, a map option parameter, one or more namespace option parameters and a null option parameter;

wherein receiving includes receiving a query including at least one valid database statement used to retrieve at least one rowset from a database and a name option parameter, wherein transforming includes overwriting a name of a row element based on the name of the option parameter; and wherein if the name option parameter is specified to be a predetermined value, then the transforming includes dropping a tag of the row element and any continued attribute.

2. The method of claim 1, wherein the query further comprises a root option parameter, wherein mapping each row element includes wrapping a plurality of row elements with a single element tag based on the root option parameter.

3. The method of claim 1, wherein the query further comprises a map option parameter, wherein transforming the rows includes overwriting the row element mapping with a mapping that interprets names as paths based on the map option parameter.

4. The method of claim 1, wherein the query further comprises at least one namespace option parameter, wherein transforming the rows and said transforming includes associating a namespace to at least a portion of the hierarchical data stream based on the at least one namespace option parameter.

5. The method of claim 1, wherein the query further comprises a null option parameter, wherein transforming the rows includes overwriting a default mapping of a NULL value based on the null option parameter during transformation of the rows.

6. The method of claim 1, further comprising receiving a query including a first database statement used to retrieve at least one rowset from the database, wherein the first database statement is nested within a second database statement used to retrieve at least one rowset from the database, wherein the first database statement has access to variables of the second database statement and the hierarchical data stream is a nested hierarchical data stream.

7. The method of claim 1, further comprising receiving a query formatted according to structured query language (SQL).

8. The method of claim 1, further comprising transforming a rowset of the at least one rowset into an eXtensible markup language (XML) datatype instance by mapping each row element of the rowset into an element of an XML data stream.

9. The method of claim 1, wherein the mode information includes a second mode in which the processor transforms the rowset into a nested tree that defines the hierarchical data stream based on, at least in part, left-to-right ordering of table information included in the query; wherein a left-outermost table is a top element, and wherein subsequent left-outermost tables are nested within the top element.

10. The method of claim 9, wherein the mode information includes a third mode in which the processor transforms the rowset into a nested tree that defines the hierarchical data stream based on, at least in part, rowset information included in the query.

11. A computer readable storage medium comprising computing executable instructions, including:

a parser module for receiving a query request and transmitting the query request to a query processing module, the query request including at least one database statement used to retrieve at least one rowset from a database, the query request also including mode information, wherein the parser module extracts the mode information from the query during parsing; and a rowset to hierarchical data stream module for receiving a rowset from the query processing module, wherein a hierarchical data stream is generated in response to the query request via transformation of the at least one rowset into a datatype instance of a hierarchical language of the hierarchical data stream, wherein each row element of the rowset is mapped into an element of the hierarchical data stream, wherein the at least one rowset is transformed into the datatype instance based on mode information received by the rowset to hierarchical data stream module from the parser module, and wherein the mode information includes the following:

a first mode in which the processor transforms the rowset into a nested tree that defines the hierarchical data stream based on, at least in part, mapping table information included in the query to one or more elements of the hierarchical data stream as a function of primary-foreign key relationships identified in the table information;

a second mode in which the processor transforms the rowset into a nested tree that defines the hierarchical data stream based on, at least in part, left-to-right ordering of table information included in the query, wherein a left-outermost table is a top element, and wherein subsequent left-outermost tables are nested within the top element; or a third mode in which the processor transforms the rowset into a nested tree that defines the hierarchical data stream based on, at least in part, rowset information included in the query, wherein the received query request includes at least one valid database statement used to retrieve at least one rowset from a database and at least one of a name option parameter, a root option parameter, a map option parameter, one or more namespace option parameters and a null option parameter;

wherein the received query request includes at least one valid database statement used to retrieve at least one rowset from a database and a name option parameter, wherein the transformation of the at least one rowset into a datatype instance includes overwriting a name of a row element based on the name of the option parameter; and wherein if the name option parameter is specified to be a predetermined value, then the transformation of the at least one rowset into a datatype instance includes dropping a tag of the row element and any continued attribute.

12. The computer readable medium of claim 11, further comprising receiving a query including a first database statement used to retrieve at least one rowset from the database, wherein the first database statement is nested within a second database statement used to retrieve at least one rowset from the database, wherein the first database statement has access to variables of the second database statement, and wherein the hierarchical data stream is a nested hierarchical data stream.

13. The computer readable medium of claim 11, wherein the parser module transmits a query request formatted according to structured query language (SQL).

14. The computer readable medium of claim 11, wherein the rowset to hierarchical data stream module receives an extensible markup language (XML) data stream.

15. A server for managing and accessing database information, comprising:

a parser that receives a query request for data to a database and parses the query, the query including mode information designating a mode from a plurality of modes that specifies, within the query itself, a hierarchical data stream organization for an output of the query, wherein the parser extracts the mode information from the query during parsing;

a query processor that retrieves at least one rowset from the database based on at least one database statement in the query request without reference to the mode information extracted during parsing; and a rowset to hierarchical processor that generates a hierarchical data stream by transforming a rowset of the at least one rowset into a datatype instance of a hierarchical language of the hierarchical data stream by mapping each row element of the rowset into an element of the hierarchical data stream, wherein the at least one rowset is transformed into the datatype instance based on mode information received by the rowset to hierarchical processor from the parser, wherein the rowset to hierarchical processor enables prepending a schema to the hierarchical data stream based on the query request, wherein the mode information includes the following:

a first mode in which the rowset to hierarchical processor transforms the rowset into a nested tree that defines the hierarchical data stream based on, at least in part, mapping table information included in the query to one or more elements of the hierarchical data stream as a function of primary-foreign key relationships identified in the table information;

a second mode in which the processor transforms the rowset into a nested tree that defines the hierarchical data stream based on, at least in part, left-to-right ordering of table information included in the query, wherein a left-outermost table is a top element, and wherein subsequent left-outermost tables are nested within the top element; or a third mode in which the processor transforms the rowset into a nested tree that defines the hierarchical data stream based on, at least in part, rowset information included in the query, wherein the received query request includes at least one valid database statement used to retrieve at least one rowset from a database and at least one of a name option parameter, a root option parameter, a map option parameter, one or more namespace option parameters and a null option parameter;

wherein the received query request includes at least one valid database statement used to retrieve at least one rowset from a database and a name option parameter, wherein the transformation of the at least one rowset into a datatype instance includes overwriting a name of a row element based on the name of the option parameter; and wherein if the name option parameter is specified to be a predetermined value, then the transformation of the at least one rowset into a datatype instance includes dropping a tag of the row element and any continued attribute.

16. The server of claim 15, wherein the query request includes a first database statement used to retrieve at least one rowset from the database, wherein the first database statement is nested within a second database statement used to retrieve at least one rowset from the database, wherein the first database statement has access to variables of the second database statement, and wherein the rowset to hierarchical processor generates a nested hierarchical data stream.

17. The server of claim 15, wherein the parser receives a query request formatted according to structured query language (SQL).

18. The server of claim 15, wherein the rowset to hierarchical processor generates an extensible markup language (XML) data stream.

* * * * *